Patented Feb. 8, 1927.

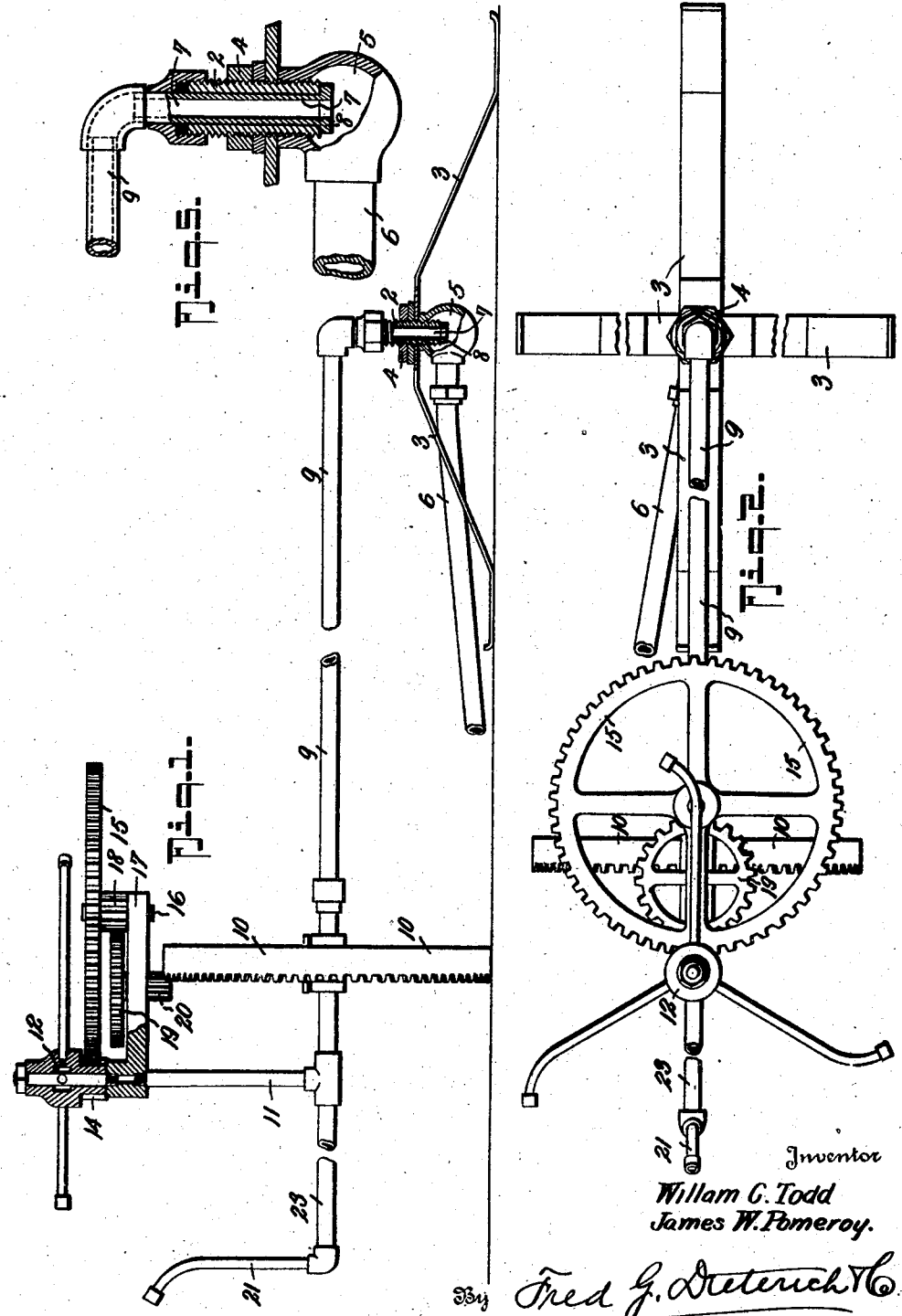

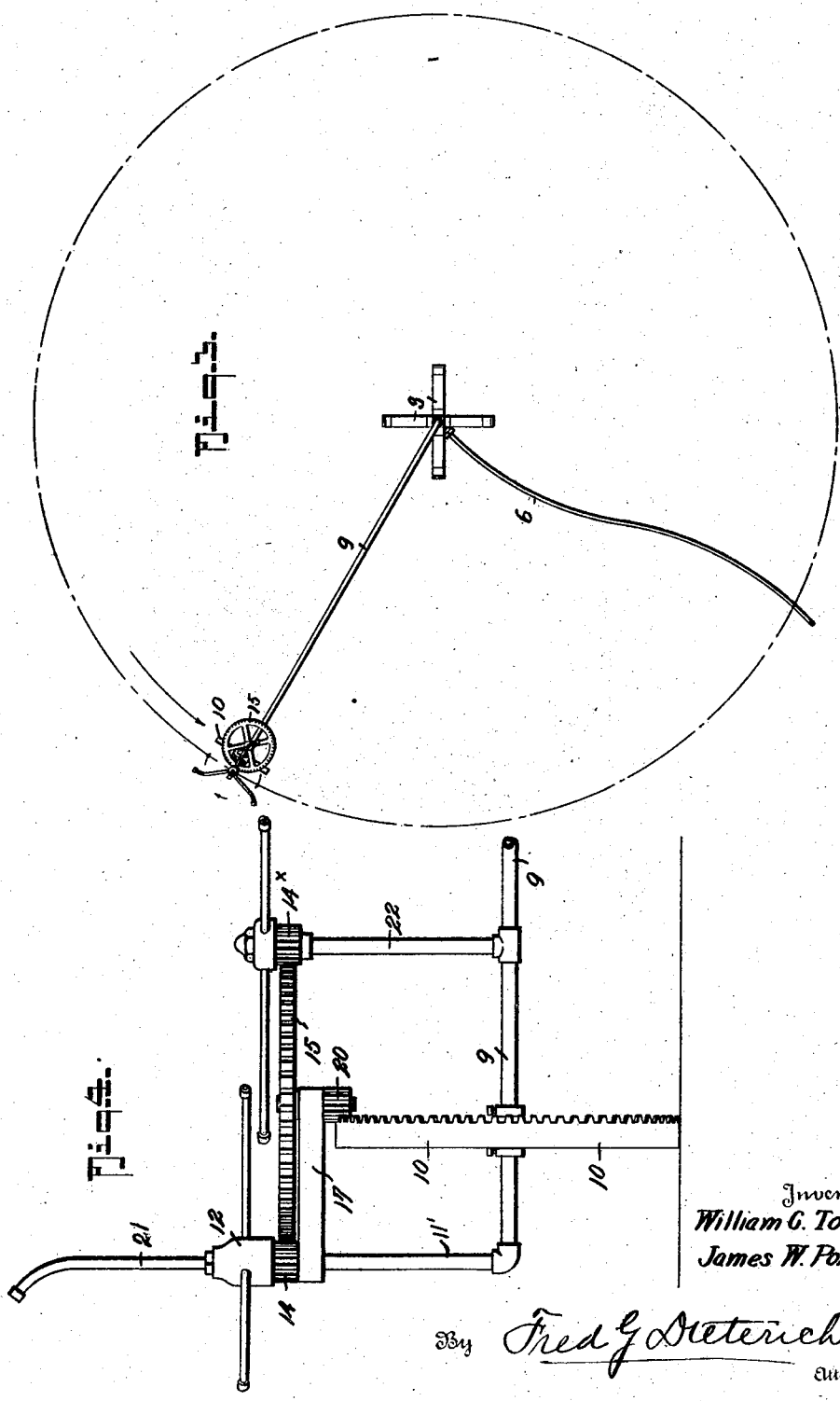

1,616,769

UNITED STATES PATENT OFFICE.

WILLIAM C. TODD AND JAMES W. POMEROY, OF VICTORIA, BRITISH COLUMBIA, CANADA.

TRAVELING LAWN SPRINKLER.

Application filed July 11, 1922. Serial No. 574,267.

This invention relates to a lawn sprinkler of that class wherein the sprinkler head is rotatably mounted on the upwardly turned end of a water delivery pipe mounted to move radially about a centre, to which the water is delivered, the outer end of which radial pipe adjacent the sprinkler head is supported on a wheel which is driven by gearing from the rotation of the sprinkler head.

The improvements are directed to the pivotal connection of the radial pipe to the central support thereof. To the provision of a supplementary water spraying nozzle angularly projecting upward and outward from the upwardly turned end of the pipe, on which the sprinkler head is mounted, and to a double drive for the supporting wheel where the water pressure may be low.

There are other features of improvement to which attention is drawn in the following specification, which fully describes the device, reference being made to the drawings by which it is accompanied, in which:

Fig. 1 is a side elevation of the sprinkler.

Fig. 2 is a plan of the same.

Fig. 3 is a plan of the sprinkler to a reduced scale, showing the manner of its sprinkling.

Fig. 4 is a modification in side elevation showing the application of two reaction sprinklers to effect rotation of the radial pipe, and Fig. 5 is an enlarged detail of the central pipe.

In these drawings 2 represents a short central pipe which is supported with its axis substantially upright in a cross shaped stand 3, being secured in the stand and the two parts of the stand secured together by a nut 4 threaded on the pipe 2 and an elbow 5 threaded on the lower end of the pipe 2 to receive the connection of the hose pipe 6 through which water is delivered to the sprinkler from any convenient source.

Rotatably fitting this central pipe 2 is an inner pipe 7 forming the stem about which the sprinkler rotates. This inner pipe has a collar or shouldered seat 8 which bears against the lower end of the central pipe 2 and prevents leakage of water past the bearing, which leakage is further prevented by a gland nut on the upper end of pipe 2.

To the upper end of this stem 7, a radial pipe 9 is connected by an elbow, the outer end of which pipe 9 is supported on a wheel 10 rotatable on the pipe 9 as on an axle.

Adjacent this supporting wheel 10, an upright pipe 11 is connected to the pipe 9 and on this upright pipe is rotatably mounted the hub 12 of a sprinkler head, the bore of which is chambered or enlarged intermediate the ends and the pipe 11 is apertured within the chambered portion to admit water thereto.

On the lower part of the hub 12 of the sprinkler head is a pinion 14, the teeth of which mesh with those of a wheel 15 rotatable on a pin 16 upwardly projecting from the end of a bracket 17 secured to the pipe 11 and projecting over the supporting wheel 10. On the hub of this wheel 15 is a pinion 18, the teeth of which mesh with those of a wheel 19, secured on a stem which is rotatable in a bearing in the same bracket 17 and carries at its lower end a pinion 20, the teeth of which mesh with corresponding teeth formed on the edge of the supporting wheel 10. Rotation of the sprinkler head 12 thus rotates the supporting wheel 10 that carries the radius pipe 9 slowly round its pivot bearing 2, sprinkling the while the area within its range.

In Figure 1 the radial pipe 9 is shown as extended beyond the track wheel 10 as at 23 and the nozzle pipe 21 is secured to the outer end of 23 so as to project a spray from the fixed nozzle 21 outward beyond the range of that from the sprinkler head: Or, as shown in Figure 4, the nozzle pipe 21 may be secured to the upper end of the pipe 11' on which the sprinkler head rotates.

Although in Fig. 1 of the drawing, the uptake pipe 11 is shown outside the supporting wheel 10, where the pressure of the water supply is low and the supply ample, a parallel pipe 22 may be connected to the radial pipe 9 as a branch within the supporting wheel 10 and a second sprinkler head mounted on it with the pinion 14$^x$ of the sprinkler head meshing with the wheel 15 on the diametrically opposite side. The pinion 20 which drives the supporting wheel 10 may be secured on the underside of the stem 16 of the wheel 15, so that both sprinkler heads act to drive the supporting wheel through the same intermediate wheel and pinion.

The device will automatically sprinkle an area considerably beyond the range of the sprinkler head 12 as it travels slowly round the circle on its track wheel 10, as the jet projected from the nozzle 21 as it moves round the circle, will throw its spray considerably beyond that of the sprinkler head 12, whether that nozzle 21 is mounted on the upright pipe 11 which directly serves the sprinkler, or, as shown in Figs. 1 and 2, on the end of the extension 23 from the pipe 9.

The speed of rotation of the supporting wheel 10 being reduced considerably from that of the sprinkler head which supplies the power, the track wheel can surmount any ordinary obstacle, such as the hose pipe which serves the sprinkler.

Having now particularly described our invention, we hereby declare that what we claim as new and desire to be protected in by Letters Patent, is:

1. A traveling lawn sprinkler, comprising in combination a stand to the centre of which a water service is connected, a radial pipe one end of which is pivotally connected to the water service of the stand to rotate around it, an upwardly projected pipe section carried on said radial pipe adjacent to its other end, a supporting wheel rotatably mounted on the radial pipe, a reaction sprinkler rotatably mounted on the said upwardly projected pipe section the hub of said sprinkler being formed with teeth as a pinion, means for rotating the supporting wheel at a reduced rate of speed from the sprinkler, and a jet nozzle fixed in the end of the radial pipe to deliver angularly outward and upward therefrom.

2. A traveling lawn sprinkler comprising a stand, a central pipe vertically secured on the stand, an inner pipe having a collar at its lower end, which pipe is rotatable in the central pipe with the collar seating against the inner end thereof and the upper end passing gland-packed through the upper end of the central pipe, a water service connected to the lower end of the central pipe, a radial pipe connected to the upper end of the inner central pipe, a supporting wheel rotatably mounted adjacent the free end of the radial pipe, a reaction sprinkler on an upright pipe connected to the radial pipe, a jet nozzle fixedly carried by said radial pipe and delivering radially outward substantially as shown and described.

3. A traveling lawn sprinkler, comprising a stand, composed of two strips of relatively thin metal medially apertured and downwardly bent toward their ends, a central pipe securing the two strips together to form a cross shaped stand, an inner pipe rotatably fitting the central pipe and having a collar at its lower end fitting against the end of the pipe, the upper end passing gland-packed through the upper end of the central pipe, means for delivering a water service to the lower end of the central pipe, a pipe secured to the upper end of the inner pipe to move radially around it, an upright pipe connected to this radial pipe intermediate its ends, a track wheel mounted adjacent the upright pipe, a reaction sprinkler rotatably mounted on the upwardly turned pipe, means for rotating the track wheel at a reduced rate of speed from the hub of the sprinkler and a nozzle projecting angularly outward and upward from the free end of the radial pipe.

In testimony whereof we affix our signatures.

WILLIAM C. TODD.
JAMES W. POMEROY.